United States Patent Office 2,847,479
Patented Aug. 12, 1958

2,847,479
3 - CYCLOHEXYLIDENEPROPYL ETHINYL METHYL CARBINOL AND PREPARATION THEREOF

Joseph Donald Surmatis, West Caldwell, N. J., assignor to Hoffmann-La Roche Inc., Nutley, N. J., a corporation of New Jersey No Drawing. Original application October 1, 1954, Serial No. 459,866, now Patent No. 2,812,361, dated November 5, 1957. Divided and this application July 17, 1957, Serial No. 672,380

2 Claims. (Cl. 260—617)

This invention relates to novel chemical compounds and to novel processes and intermediates useful in the preparation thereof. More particularly, it relates to 3-cyclohexylidenepropyl vinyl methyl carbinol, which is useful as an odor-imparting agent in the preparation of perfumes and of scented compositions generally, and relates further to the preparation of said 3-cyclohexylidenepropyl vinyl methyl carbinol.

One comprehensive aspect of the invention relates to a process which comprises halogenating 1-vinyl-cyclohexanol to form 2-cyclohexylideneethyl halide, reacting the latter with an acetoacetic ester and decarboxylating the condensation product to form 3-cyclohexylidenepropyl methyl ketone, ethinylating the latter to form 3-cyclohexylidenepropyl ethinyl methyl carbinol and partially hydrogenating the latter to form 3-cyclohexylidenepropyl vinyl methyl carbinol. This process can be visualized in terms of the following flow sheet:

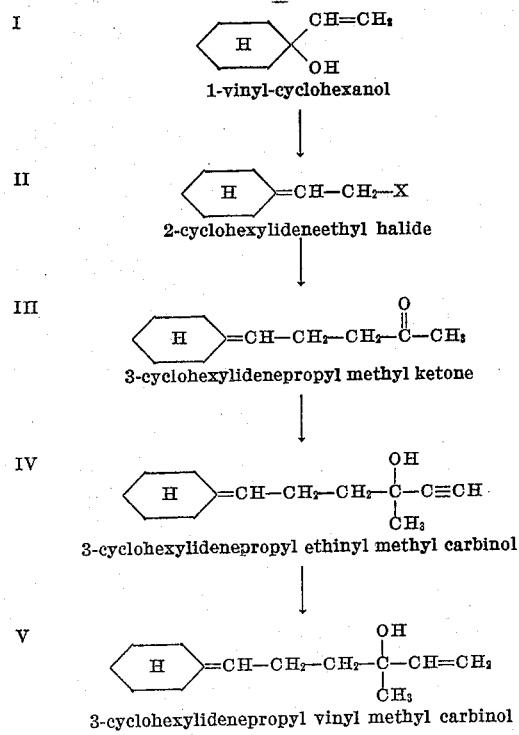

A preferred mode of executing the comprehensive process referred to above comprises reacting the known starting material 1-vinyl-cyclohexanol with commercial concentrated hydrochloric acid or commercial concentrated hydrobromic acid (respectively having concentrations of about 37 percent by weight HCl and 48 percent by weight HBr) at about room temperature thereby producing the corresponding 2-cyclohexylideneethyl halide; reacting the latter with a lower alkyl acetoacetate (e. g. ethyl acetoacetate or methyl acetoacetate) in the presence of an alkaline condensation agent (e. g. an alkali metal such as sodium or potassium or an alkali metal lower alkoxide such as sodium methylate or potassium ethylate) and hydrolyzing the condensation product to decarboxylate the same (e. g. by saponifying with an aqueous alkali such as sodium hydroxide or potassium hydroxide, acidifying and heating) thereby producing 3-cyclohexylidenepropyl methyl ketone; condensing the latter with acetylene in the presence of an alkaline condensation agent (such as sodium or sodamide) in liquid ammonia solution, thereby producing 3-cyclohexylidenepropyl ethinyl methyl carbinol; and reacting the latter with approximately 1 molar proportion of elemental hydrogen in the presence of a selective hydrogenation catalyst which preferentially catalyzes the reduction of the acetylenic linkage thereby producing 3-cyclohexylidenepropyl vinyl methyl carbinol. Selective hydrogenation catalysts having the indicated characteristic are known to the art, being disclosed for example by Lindlar, Helvetica Chimica Acta, 35, 446 (1952).

The invention is further disclosed in the following examples, which are illustrative but not limitative thereof:

Example 1

445 g. of 1-vinyl-cyclohexanol was stirred for one hour with 1500 cc. of concentrated (37 percent) aqueous hydrochloric acid. The oil was separated, washed twice with water, and dried over calcium chloride. The 2-cyclohexylideneethyl chloride obtained had $n_D^{25}=1.4994$.

2-cyclohexylideneethyl bromide was made similarly by reacting 1-vinyl-cyclohexanol with 48 percent aqueous hydrobromic acid at room temperature.

Example 2

In a five-liter flask, there was placed 390 g. of ethyl acetoacetate, 157 g. of sodium methylate and two liters of benzene. 414 g. of 2-cyclohexylideneethyl chloride was added at 40° C. in 30 minutes while stirring vigorously. The reaction mixture was stirred for three hours at 60–70° C., then for two hours at reflux temperature. After cooling, the reaction mixture was washed twice, each time with two liters of water. The benzene was distilled off under vacuum. The residual light brown colored syrup was dissolved in two liters of ethyl alcohol. This was placed in a flask together with 200 g. of potassium hydroxide and 500 cc. of water. The saponification was accomplished by stirring at 40–50° C. for four hours. Concentrated hydrochloric acid was dropped in from a separatory funnel, at such a rate that evolution of carbon dioxide did not cause foaming, until the mixture became strongly acid. The oil layer was removed. The aqueous layer was diluted with two liters of water and extracted with 500 cc. of benzene. The benzene extract and the oil layer were combined, washed neutral and dried over calcium chloride. On fractionation, there was obtained 3-cyclohexylidenepropyl methyl ketone, distilling at 103° C./6 mm., $n_D^{25}=1.4760$.

2-cyclohexylideneethyl bromide can be used as a reactant in the process of this example, in lieu of the chloride, by using a mol equivalent weight of the former.

Example 3

26 g. of metallic sodium was dissolved in one liter of liquid ammonia. Acetylene was bubbled into the solution, while stirring, until the color of the solution changed from deep blue to white. 159 g. of 3-cyclohexylidenepropyl methyl ketone dissolved in 200 cc. of diethyl ether was dropped into the stirred reaction mixture in one hour. Stirring was continued for three more hours while a slow stream of acetylene was bubbled in. The acetylene addition was stopped and the stirring was continued for 15 hours longer. The ammonia was then distilled off and the residue was washed with 2 liters of 5 percent aqueous sulfuric acid. The product was water washed, and dried over calcium sulfate. Upon fractionation, there was obtained 3-cyclohexylidenepropyl ethinyl methyl carbinol, distilling at 75° C./0.2 mm., $n_D^{25}=1.490$.

*Example 4*

117 g. (0.6 mol) of 3-cyclohexylidenepropyl ethinyl methyl carbinol, 20 g. of 5 percent lead-palladium-calcium carbonate catalyst (disclosed by Lindlar, above cited) and 100 cc. of petroleum ether were placed in a flask equipped with an efficient stirrer. The material was hydrogenated at one atmosphere hydrogen pressure and 25–30° C. until hydrogen uptake ceased. There was required 0.6 mol of hydrogen. The catalyst was filtered off, and the product was fractionated. There was obtained 3-cyclohexylidenepropyl vinyl methyl carbinol distilling at 73° C./0.2 mm., $n_D^{25}=1.489$. The product had a musty odor reminiscent of fresh earth and mushrooms, and is useful as an odor imparting agent, especially to impart an earthy accent to floral fragrances.

This application is a division of my co-pending application Serial No. 459,866, filed October 1, 1954, which issued as U. S. Patent No. 2,812,361 on November 5, 1957.

I claim:

1. 3-cyclohexylidenepropyl ethinyl methyl carbinol.
2. A process of making 3-cyclohexylidenepropyl ethinyl methyl carbinol which comprises ethinylating 3-cyclohexylidenepropyl methyl ketone.

No references cited.